United States Patent
Vencelj et al.

(10) Patent No.: US 9,881,708 B1
(45) Date of Patent: Jan. 30, 2018

(54) RADIATION AREA MONITOR DEVICE AND METHOD

(71) Applicant: Consolidated Nuclear Security, LLC, Oak Ridge, TN (US)

(72) Inventors: Matjaz Vencelj, Ljubljana (SI); Ashley C. Stowe, Knoxville, TN (US); Toni Petrovic, Ljubljana (SI); Jonathan S. Morrell, Farragut, TN (US); Andrej Kosicek, Podsreda (SI)

(73) Assignees: Consolidated Nuclear Security, LLC, Oak Ridge, TN (US); Jozef Stefan Institute, Ljubljana (SI); AISense d.o.o., Podsreda (SI)

( * ) Notice: Subject to any disclaimer, the term of this patent is extended or adjusted under 35 U.S.C. 154(b) by 0 days.

(21) Appl. No.: 15/485,373

(22) Filed: Apr. 12, 2017

(51) Int. Cl.
  *G21F 3/00* (2006.01)
  *G01T 3/00* (2006.01)
  *G01T 7/12* (2006.01)
  *G01T 1/16* (2006.01)

(52) U.S. Cl.
  CPC ............... *G21F 3/00* (2013.01); *G01T 1/16* (2013.01); *G01T 3/00* (2013.01); *G01T 7/125* (2013.01)

(58) Field of Classification Search
  CPC ... G01T 1/16; G01T 3/00; G01T 7/125; G21F 3/00
  See application file for complete search history.

(56) References Cited

U.S. PATENT DOCUMENTS

| | | | |
|---|---|---|---|
| 4,820,925 A | 4/1989 | Balmer et al. | |
| 5,153,563 A | 10/1992 | Goto et al. | |
| 5,286,973 A | 2/1994 | Westrom et al. | |
| 5,528,038 A * | 6/1996 | Yoshiike | G01J 5/34 250/338.3 |
| 5,640,141 A | 6/1997 | Myllymaki | |
| 9,147,503 B2 | 9/2015 | Coleman et al. | |
| 2014/0183359 A1 | 7/2014 | Tamaru et al. | |
| 2014/0361190 A1 | 12/2014 | Willis et al. | |

* cited by examiner

*Primary Examiner* — Mark R Gaworecki
(74) *Attorney, Agent, or Firm* — Clements Bernard Walker PLLC; Christopher L. Bernard

(57) ABSTRACT

A radiation area monitor device/method, utilizing: a radiation sensor; a rotating radiation shield disposed about the radiation sensor, wherein the rotating radiation shield defines one or more ports that are transparent to radiation; and a processor operable for analyzing and storing a radiation fingerprint acquired by the radiation sensor as the rotating radiation shield is rotated about the radiation sensor. Optionally, the radiation sensor includes a gamma and/or neutron radiation sensor. The device/method selectively operates in: a first supervised mode during which a baseline radiation fingerprint is acquired by the radiation sensor as the rotating radiation shield is rotated about the radiation sensor; and a second unsupervised mode during which a subsequent radiation fingerprint is acquired by the radiation sensor as the rotating radiation shield is rotated about the radiation sensor, wherein the subsequent radiation fingerprint is compared to the baseline radiation fingerprint and, if a predetermined difference threshold is exceeded, an alert is issued.

8 Claims, 2 Drawing Sheets

RADIATION AREA MONITOR DEVICE AND METHOD

STATEMENT REGARDING FEDERALLY SPONSORED RESEARCH OR DEVELOPMENT

The U.S. Government has rights to the present disclosure pursuant to Contract No. DE-NA0001942 between the U.S. Department of Energy and Consolidated Nuclear Security, LLC.

FIELD OF THE DISCLOSURE

The present disclosure relates generally to a radiation area monitor device and method. More specifically, the present invention relates to a radiation area monitor device and method for introducing, locating, relocating, and/or removing a gamma and/or neutron emitting material.

BACKGROUND OF THE DISCLOSURE

The monitoring of radioactive materials is of critical importance in many fields. Radioactive material accounting and control is often required by law and/or treaty. However, radioactive material monitoring is typically performed indirectly, by the observation of storage containers or the logging of RFID tags placed on the storage containers. In such situations, it is possible that radioactive material is removed while a storage container remains. Thus, it is not recognized that radioactive material is actually gone.

Thus, what are still needed in the art are devices and methods for directly monitoring the presence/location of a radioactive material by monitoring gamma and/or neutron emission from the radioactive material in real time. Preferably, these devices and methods would generate and utilize a three-dimensional (3D) map of a storage area and monitor changes over time with an alarm triggered by predetermined changes.

BRIEF SUMMARY OF THE DISCLOSURE

In various exemplary embodiments, the present disclosure provides a radiation area monitor device and method for directly monitoring the presence/location of a radioactive material by monitoring gamma and/or neutron emission from the radioactive material in real time. The radiation area monitor device and method generates and utilizes a 3D map of a storage area and monitor changes over time with an alarm triggered by predetermined changes.

In one exemplary embodiment, the present disclosure provides a radiation area monitor device, including: a radiation sensor; a rotating radiation shield disposed about the radiation sensor, wherein the rotating radiation shield defines one or more ports that are transparent to radiation; and a processor operable for analyzing and storing a radiation fingerprint acquired by the radiation sensor as the rotating radiation shield is rotated about the radiation sensor. Optionally, the radiation sensor includes a gamma sensor. Optionally, the radiation sensor includes a neutron sensor. Optionally, the radiation sensor includes a dual gamma/neutron radiation sensor. The radiation area monitor device is operable for selectively operating in: a first supervised mode during which a baseline radiation fingerprint is acquired by the radiation sensor as the rotating radiation shield is rotated about the radiation sensor; and a second unsupervised mode during which a subsequent radiation fingerprint is acquired by the radiation sensor as the rotating radiation shield is rotated about the radiation sensor, wherein the subsequent radiation fingerprint is compared to the baseline radiation fingerprint and, if a predetermined difference threshold is exceeded, an alert is issued. The radiation area monitor device further includes a rotation mechanism coupled to the rotating radiation shield operable for selectively rotating the rotating radiation shield disposed about the radiation sensor.

In another exemplary embodiment, the present disclosure provides a radiation area monitor method, including: providing a radiation sensor; rotating a rotating radiation shield disposed about the radiation sensor, wherein the rotating radiation shield defines one or more ports that are transparent to radiation; and analyzing and storing a radiation fingerprint acquired by the radiation sensor as the rotating radiation shield is rotated about the radiation sensor. Optionally, the radiation sensor includes a gamma sensor. Optionally, the radiation sensor includes a neutron sensor. Optionally, the radiation sensor includes a dual gamma/neutron radiation sensor. The radiation area monitor method is operable for selectively operating in: a first supervised mode during which a baseline radiation fingerprint is acquired by the radiation sensor as the rotating radiation shield is rotated about the radiation sensor; and a second unsupervised mode during which a subsequent radiation fingerprint is acquired by the radiation sensor as the rotating radiation shield is rotated about the radiation sensor, wherein the subsequent radiation fingerprint is compared to the baseline radiation fingerprint and, if a predetermined difference threshold is exceeded, an alert is issued. The radiation area monitor method further includes selectively rotating the rotating radiation shield disposed about the radiation sensor using a rotation mechanism coupled to the rotating radiation shield.

In a further exemplary embodiment, the present disclosure provides a radiation area monitor device, including: a radiation sensor having a directional radiation sensing capability; a rotation mechanism operable for selectively rotating the radiation sensor such that the directional radiation sensing capability selectively sweeps an area of interest; and a processor operable for analyzing and storing a radiation fingerprint acquired by the radiation sensor as the directional radiation sensing capability selectively sweeps the area of interest. Optionally, the radiation sensor includes a gamma sensor. Optionally, the radiation sensor includes a neutron sensor. Optionally, the radiation sensor includes a dual gamma/neutron radiation sensor. The radiation area monitor device is operable for selectively operating in: a first supervised mode during which a baseline radiation fingerprint is acquired by the radiation sensor as the directional radiation sensing capability selectively sweeps the area of interest; and a second unsupervised mode during which a subsequent radiation fingerprint is acquired by the radiation sensor as the directional radiation sensing capability selectively sweeps the area of interest, wherein the subsequent radiation fingerprint is compared to the baseline radiation fingerprint and, if a predetermined difference threshold is exceeded, an alert is issued.

BRIEF DESCRIPTION OF THE DRAWINGS

The present disclosure is illustrated and described herein with reference to the various drawings, in which like reference numbers are used to denote like device components/method steps, as appropriate, and in which.

DETAILED DESCRIPTION OF THE DISCLOSURE

Figure 1:
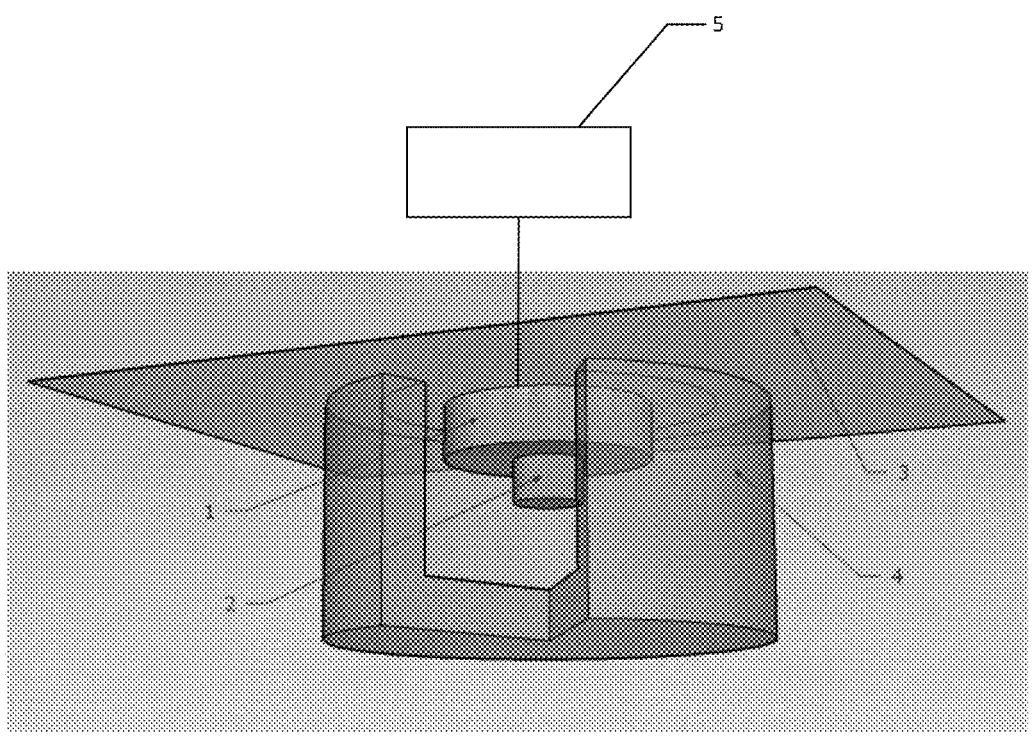
FIG. 1 is a schematic diagram illustrating one exemplary embodiment of the radiation area monitor device of the present disclosure.

Referring now specifically to FIG. 1, in one exemplary embodiment, the present disclosure provides a radiation area monitor device including a gamma and/or neutron sensor 2 that is coupled to appropriate electronics 1. A motorized rotating shield 4 including one or more radiation transparent windows or ports is disposed and rotates about the sensor(s) 2 and electronics 1. Advantageously, the device can be coupled to a surface 3, such as a floor, ceiling, wall, or other structure, in a monitoring area of interest. In this manner, the azimuthal spatial distribution of a gamma and/or neutron emitting source in the monitoring area of interest with respect to a plane that the device is coupled to can be determined by evaluating and monitoring the temporal evolution of a count rate signal from the sensor(s) 2 as the shield (4), and the associated window(s) or port(s), are rotated about the sensor(s) 2.

The sensor(s) 2 can include separate gamma and/or neutron detectors as associated photodetectors, for example, or a single detector can be used for gamma and neutron detection. The gamma detector should be solid state and be of sufficient size and density to absorb a majority of the incident gamma rays of interest. The neutron detector should also be solid state and be of sufficient size and density to absorb a majority of the incident neutrons of interest. Such crystals can be scintillating, semiconducting, or charge collecting. Exemplary gamma materials include NaI, CsI2, BGO, SrI2, CZT, HPGe, LaBr, LYSO, CdWO4, BaF2, activated acrylates, or the like. Exemplary neutron materials include acrylic, LiInSe2, BP, BN, LiF, CdS, ZnSe, CdWO4, Gd2SiO5, CLYC, a Si-coated material, or the like. Preferably, the detection crystal has at least one detector directly or indirectly coupled to its surface, such as a PMT, SiPM, or APD photodetector or the like.

The sensor(s) 2 are disposed within the shield 4, which rotates about the sensor(s) 2 such that the window(s) or port(s) periodically expose the sensor(s) 2 to incident radiation from the radiation source. Any suitable motorized rotation mechanism can be utilized to rotate the shield 4. Accordingly, the sensors(s) 2, shield 4, and rotation mechanism can all be coupled to and/or disposed within an appropriate housing (not illustrated) that can be permanently or removably coupled to the surface 3. In an alternative exemplary embodiment, the shield 4 can be stationary and a directionally biased sensor 2 can rotate within the shield 4. In such an alternative embodiment, when the sensor 2 is directionally biased, the shield 4 may not be necessary, as the rotation of the sensor 2 itself would generate the desired periodicity. Further, a directionally biased sensor 2 could be created by rotating the sensor 2 and the shield 4 in unison. An exemplary rotational speed for the shield 4 is under about 1 Hz, or 1 rotation every second. This relatively low revolution frequency is desirable in cases where the shield 4 cannot be made to have an axially symmetric moment of inertia. The window(s) or port(s) may be physical voids in the shield 4 or may incorporate a radiation transparent material. A substantially cylindrical shield 4 is illustrated in FIG. 1, however, other suitable shapes can also be utilized, such as a rotating plate, for example. The shield 4 can be made of any suitable gamma ray absorbing material, such as a lead or tungsten, or a neutron absorbing material, such as 6Li, HDPE, or cadmium, or in a combination, such as lead lined with 6Li foil. Similarly, tungsten could be used to absorb both. These shield materials must not create additional radiation emission as the result of shielding incident radiation. In another exemplary embodiment, the rotating shield 4 could be of a more complex shape, to form a coded aperture, which in combination with the rotation, could allow for a computed reproduction of a rudimentary image of the monitored area.

The sensor(s) 2 and/or electronics 1 are coupled to a processor 5 for collecting and analyzing the azimuthal spatial distribution of the gamma and/or neutron emitting source in the monitoring area of interest by evaluating and monitoring the temporal evolution of the count rate signal from the sensor(s) 2 as the shield (4), and the associated window(s) or port(s), are rotated about the sensor(s) 2. In this manner, a 3D area sweep map can be created and stored, and then an alarm can be raised if the area sweep map changes in excess of a predetermined threshold amount, indicating the potentially problematic movement of the radiation source itself. Alarm thresholds can be set above background fluctuations, but below the radiation flux of a single object so that any movement of the object raises an alarm. An (optical) angular encoder may enable the processor 5 to correlate, at each time, absolute angular shield position and a signal from the sensor(s) 2.

Figure 2:
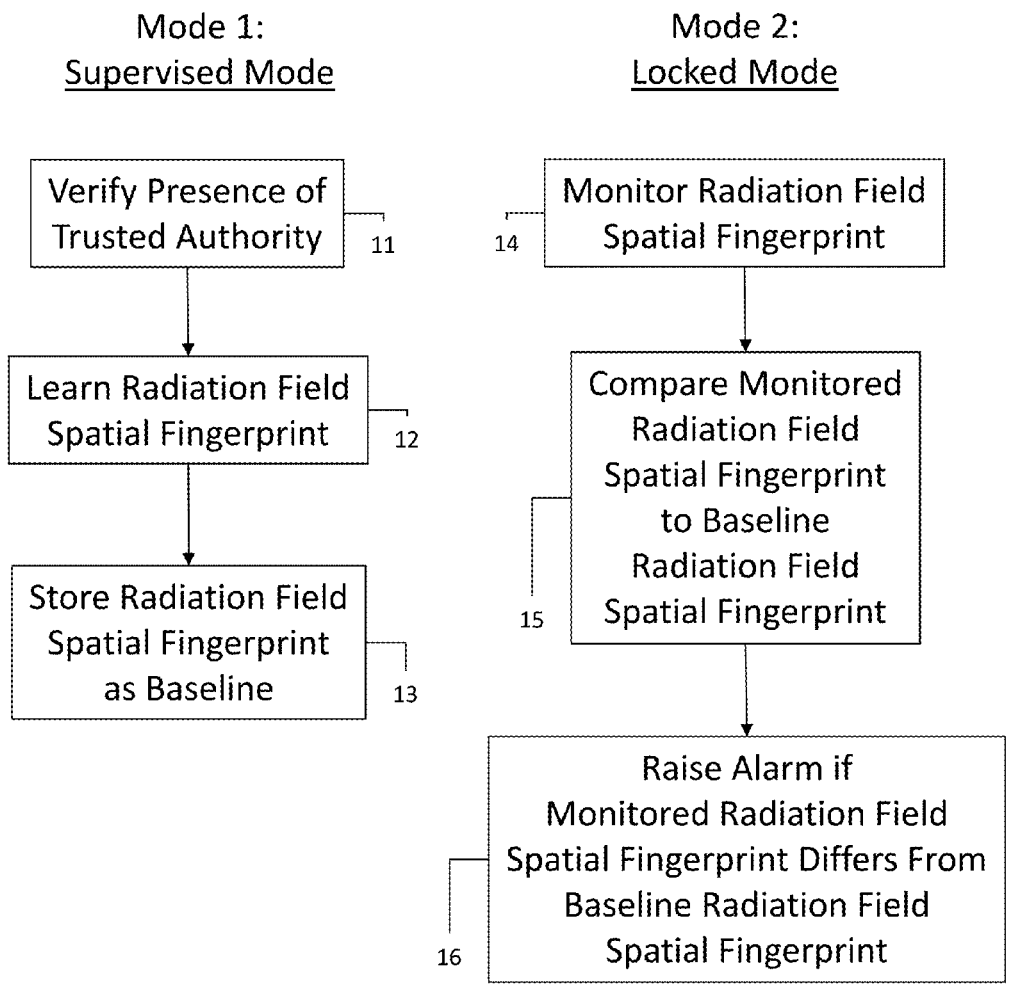
FIG. 2 is a series of flowcharts illustrating two exemplary embodiments of the method for locating a radiation emitting source of the present disclosure, highlighting a supervised mode and a locked mode.

Referring now specifically to FIG. 2, in two exemplary embodiments, the radiation monitor device can selectively operate in one of two modes: Mode 1—Supervised Mode or Mode 2—Locked Mode.

In the supervised mode, a user is preferably required to continuously (or nearly continuously) prove their presence in the area of interest by cryptographic or other means (Block 11) while the device "learns" the gamma and/or neutron fingerprints in the area of interest (Block 12). Ultimately, these fingerprints are stored as a baseline for later comparisons (Block 13). This operation mode is used, for example, during or immediately after the movement of detectable material and/or items that could significantly shield or otherwise alter the radiation field from the detectable material. At the end of the "learn" period, the fingerprints can be cryptographically signed and stored locally and/or remotely (Block 13).

In the locked mode, the device continuously (or nearly continuously) measures and monitors the spatial radiation field fingerprint in the area of interest (Block 14). The acquired fingerprint is compared to the stored fingerprint, again, either locally and/or remotely (Block 15). If the comparison is performed locally, the device either keeps sending "OK" messages to a central system or is capable or responding to a remote query. If the comparison is performed remotely, the newly acquired fingerprint is sent instead. In either case, it may be desirable for communications between the device and the central system to be cryptographically signed for security purposes. If a statistically significant deviation from baseline is detected, then the device stops sending "OK" messages (and/or confirming normal status upon query) and/or an alarm condition is raised, depending on the given architecture chosen (Block 16). A general communications status alarm may also be utilized.

Thus, the radiation monitor device is used to make radiation field comparisons over time such that central decision-making can be made immediately aware of changes in or movements of radiation source material. The device can be used in unknown areas—to gather information related to radiation source material—or it can be used in known areas (such as storage facilities)—to alert personnel to any changes or movements due to leakage, sabotage, theft, etc. This capability is crucial to any organization that stores radioactive material or requires information regarding the presence of radioactive material in an area. It should be noted that a coordinated array of devices can also be utilized for best results in some circumstances.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following non-limiting claims.

What is claimed is:

1. A radiation area monitor device, comprising:
    a radiation sensor;
    a rotating radiation shield disposed about the radiation sensor, wherein the rotating radiation shield defines one or more ports that are transparent to radiation; and
    a processor operable for analyzing and storing a radiation fingerprint acquired by the radiation sensor as the rotating radiation shield is rotated about the radiation sensor;
    wherein the radiation sensor comprises one or more of a gamma sensor and a neutron sensor.

2. The radiation area monitor device of claim 1, wherein the radiation sensor comprises a dual gamma/neutron radiation sensor.

3. The radiation area monitor device of claim 1, wherein the radiation area monitor device is operable for selectively operating in:
    a first supervised mode during which a baseline radiation fingerprint is acquired by the radiation sensor as the rotating radiation shield is rotated about the radiation sensor; and
    a second unsupervised mode during which a subsequent radiation fingerprint is acquired by the radiation sensor as the rotating radiation shield is rotated about the radiation sensor, wherein the subsequent radiation fingerprint is compared to the baseline radiation fingerprint and, if a predetermined difference threshold is exceeded, an alert is issued.

4. The radiation area monitor device of claim 1, further comprising a rotation mechanism coupled to the rotating radiation shield operable for selectively rotating the rotating radiation shield disposed about the radiation sensor.

5. A radiation area monitor method, comprising:
    providing a radiation sensor;
    rotating a rotating radiation shield disposed about the radiation sensor, wherein the rotating radiation shield defines one or more ports that are transparent to radiation; and
    analyzing and storing a radiation fingerprint acquired by the radiation sensor as the rotating radiation shield is rotated about the radiation sensor;
    wherein the radiation sensor comprises one or more of a gamma sensor and a neutron sensor.

6. The radiation area monitor method of claim 5, wherein the radiation sensor comprises a dual gamma/neutron radiation sensor.

7. The radiation area monitor method of claim 5, wherein the radiation area monitor method is operable for selectively operating in:
    a first supervised mode during which a baseline radiation fingerprint is acquired by the radiation sensor as the rotating radiation shield is rotated about the radiation sensor; and
    a second unsupervised mode during which a subsequent radiation fingerprint is acquired by the radiation sensor as the rotating radiation shield is rotated about the radiation sensor, wherein the subsequent radiation fingerprint is compared to the baseline radiation fingerprint and, if a predetermined difference threshold is exceeded, an alert is issued.

8. The radiation area monitor method of claim 5, further comprising selectively rotating the rotating radiation shield disposed about the radiation sensor using a rotation mechanism coupled to the rotating radiation shield.

\* \* \* \* \*